United States Patent [19]
Christensen

[11] Patent Number: 5,267,624
[45] Date of Patent: Dec. 7, 1993

[54] WINTER FRONT ASSEMBLY FOR CHARGE AIR COOLED TRUCKS AND METHOD

[75] Inventor: Steven S. Christensen, Livermore, Calif.

[73] Assignee: Paccar Inc., Bellevue, Wash.

[21] Appl. No.: 788,033

[22] Filed: Nov. 5, 1991

[51] Int. Cl.$^5$ .................... B60K 11/04; B60K 13/02
[52] U.S. Cl. .................. 180/68.2; 180/68.3; 180/68.4; 180/68.6; 165/98
[58] Field of Search ............ 180/68.1, 68.3, 68.4, 180/68.2, 68.6; 123/41.04, 41.58; 165/13, 98; 237/79; 236/35.2; 49/39

[56] References Cited
U.S. PATENT DOCUMENTS

| | | | |
|---|---|---|---|
| 1,338,585 | 4/1920 | Pate | 123/41.58 |
| 1,422,306 | 7/1922 | Runnels | 49/39 |
| 2,155,439 | 4/1939 | Morrison | 165/13 |
| 2,217,302 | 10/1940 | Agerell et al. | 180/68.1 |
| 2,729,202 | 1/1956 | Sanders | 123/41.04 |
| 3,095,147 | 6/1963 | Abrams | 236/35.2 |
| 4,169,501 | 10/1979 | Takeuchi et al. | 180/68.6 |
| 4,523,657 | 6/1985 | Kooyumjian | 180/68.1 |
| 4,750,549 | 6/1988 | Ziegler et al. | 180/68.1 |
| 4,842,319 | 6/1989 | Ziegler et al. | 180/68.6 |
| 4,883,139 | 11/1989 | Gross | 180/68.6 |

Primary Examiner—Richard M. Camby
Attorney, Agent, or Firm—Flehr, Hohbach, Test, Albritton & Herbert

[57] ABSTRACT

A winter front assembly (41) for mounting to a truck having a charge air cooler (22) mounted in front of a radiator (23) and radiator fan (24). The winter front is provided as a sheet-like cover member (42) with an opening (44) having a configuration exposing at least a portion of each of the core tubes (29) in the charge air cooler (22). The opening (44) further is substantially circumferentially balanced in an annular area in front of the tips (53) of the radiator fan (24). The winter front (41) also includes an auxiliary cover member (61) formed for selective securement to the main cover member (42) to substantially reduce the area of the opening (44). The auxiliary cover (61) is configured to maintain direct air flow over at least a portion of each of the core tubes (29) and to maintain circumferentially balanced air flow to the radiator fan (24) in the annular area proximate the fan tips (53). A method of covering the front of a cooling system (21) with the winter front (41) also is provided.

11 Claims, 3 Drawing Sheets

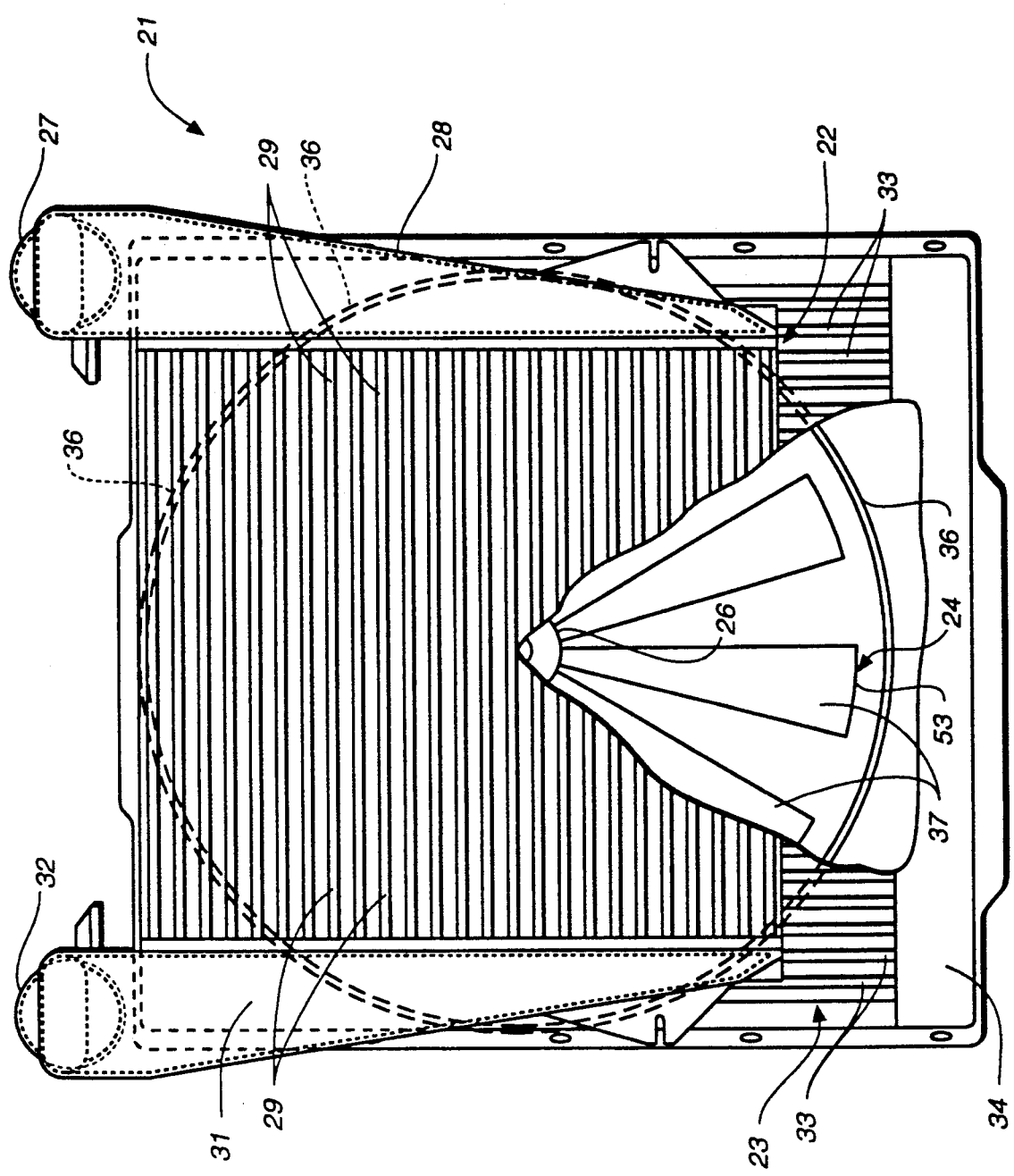
FIG._1
*(PRIOR ART)*

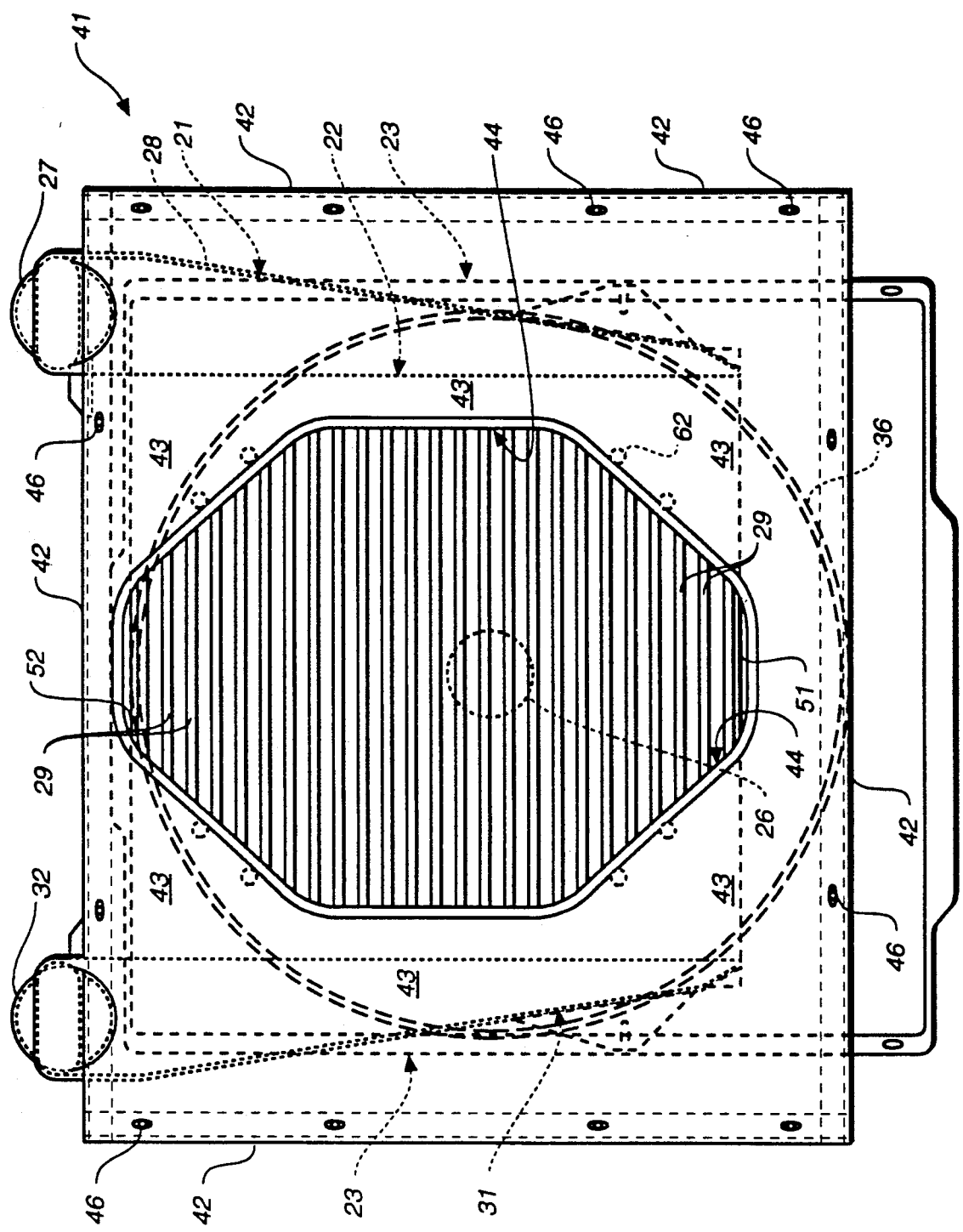
FIG._2

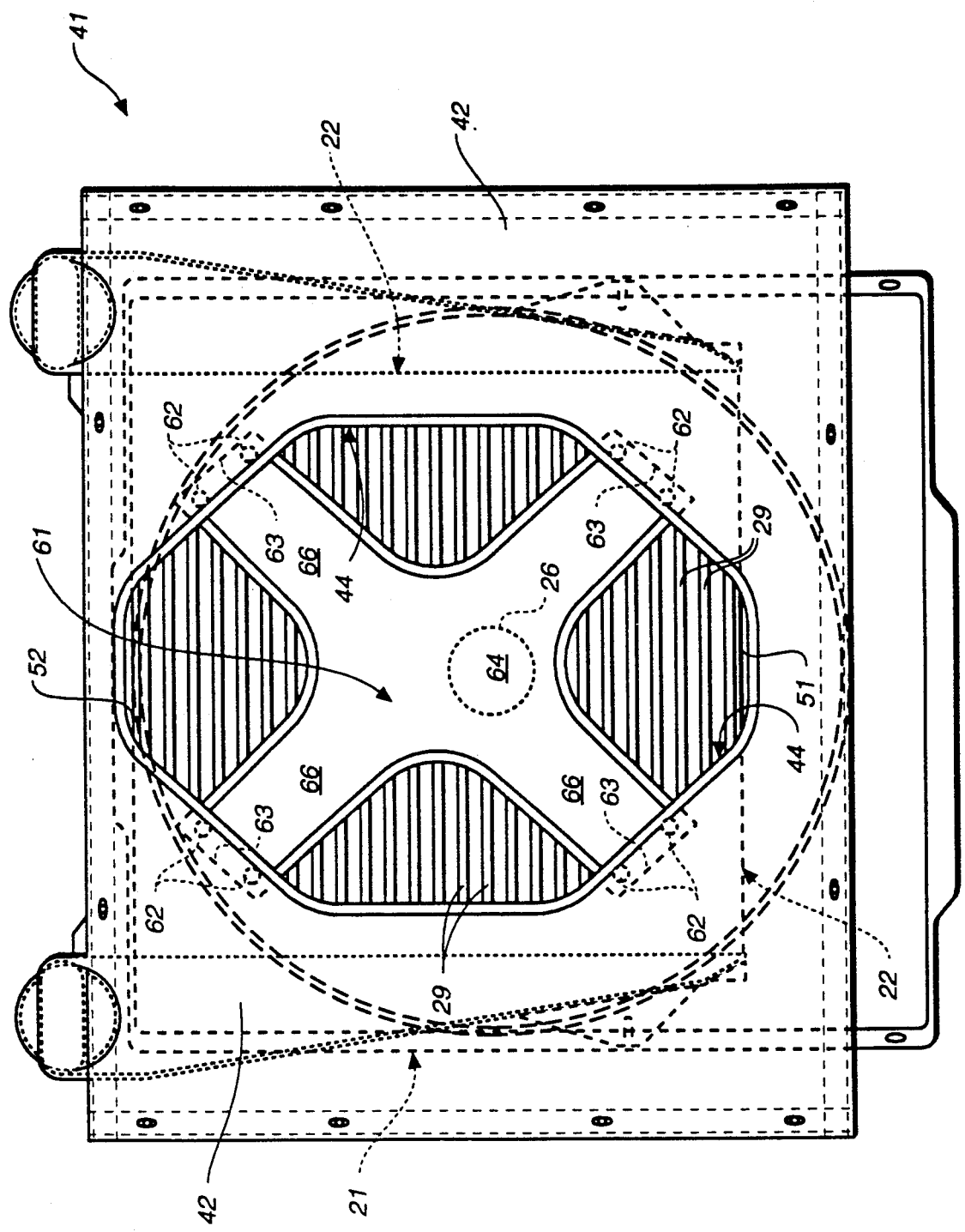
FIG._3

WINTER FRONT ASSEMBLY FOR CHARGE AIR COOLED TRUCKS AND METHOD

TECHNICAL FIELD

The present invention relates, in general, to cooling system masking or blocking assemblies, and more particularly, relates to winter front assemblies for charge air cooled trucks and the like.

BACKGROUND ART

Large, diesel-powered trucks and other vehicles often employ turbo-charged intake air systems. Such systems typically include a heat exchanger between the turbo-charger and the engine so as to reduce the temperature of the incoming air after it has been increased by compression in the turbo-charger. Such heat exchangers are known as charge air coolers and are typically positioned in front a conventional water radiator for the engine. Thus, large diesel trucks often have a cooling assembly in which a charge air cooler is positioned in front of a radiator, which is positioned in front a fan assembly.

The temperature drop between the intake and outlet of a charge air cooler can be between 150° to over 200° F., which makes the thermal stress and the possibility for thermal fatiguing of such heat exchangers extreme. A nominal design life for a charge air cooler is about 300,000 vehicle miles and, in order to withstand this stress and achieve such a design life, charge air coolers typically are formed as brazed assemblies of aluminum core tubes and fins that are attached by welding to cast aluminum manifolds. The problem of leakage in a charge air cooler also is greater than in a standard copper/brass water radiator because it is harder to reliably contain air under pressure than water.

As the temperature in which the truck is traveling drops, however, both the charge air cooler and conventional radiator for a truck tend to dissipate too much heat, which interferes with engine efficiency and comfort of the truck driver in the cab. One way of mitigating this problem which is in wide-spread use is to mount a mask or partial shield, usually referred to as a "winter front", in front of the cooling assembly. Typical of truck winter front assemblies is the winter front disclosed in U.S. Pat. No. 4,523,657 to Kooyumjian. The Kooyumjian winter front includes sheet-like panel members which are mounted to the front of the radiator to define a central diamond opening having an area less than the radiator. In the Kooyumjian winter front, the panel flap members can be selectively buttoned by snaps so as to enable variation of the size of the opening in accordance with the weather conditions being experienced by the truck. Smaller openings are used for cold weather so as to limit the area of the core tubes of the radiator which are exposed to direct air flow.

In other prior art charge air coolers, an opening having the shape of a television set or circle is provided that can be selectively reduced in area for colder operating conditions.

Shielding or radiator control assemblies have also been used in connection with automobiles operated under cold conditions. Thus, U.S. Pat. Nos. 1,338,585 1,422,306, 2,155,439, 2,729,202, 3,095,147 and 4,883,139 are typical of systems which have been employed on automobiles to a limited degree. Most of these systems, and particularly the ones involving moveable shutter assemblies, are somewhat complex and costly to install and are not easily removed.

While winter fronts are effective in controlling excess cooling, two problems have been encountered in connection with use of the same. First, in trucks having charge air coolers, winter fronts, such as disclosed in the Kooyumjian patent or the TV set-opening winter fronts, tend to thermally stress the charge air coolers and produce fatigue failures. In the Kooyumjian winter front, for example, there are three opening sizes possible. In all three openings, however, there are core tubes which are not exposed to incoming air. The result is that some of the core tubes are exposed to incoming air, while other core tubes are not exposed to direct air flow. This causes the core tubes to experience substantial temperature differentials, which in turn stresses the core tubes to a substantial degree. Fatigue studies of charge air cooler failures dramatically reveal that core tube failures are significantly higher in the areas which are completely blocked by the winter front.

A second important problem which can incur in connection with winter fronts is that blocking the axially aligned cooling system with a winter front produces mechanical stress on the cooling system fan. As the fan moves across the winter front opening, it "sees" or encounters a stream of incoming air. When the fan moves behind an area which is blocked by the winter front, the loading of the fan is increased. Thus, winter front openings which are asymmetric with respect to the cooling system fan will cause fan assembly mechanical fatigue.

Accordingly, it is an object of the present invention to provide a winter front assembly suitable for use with a charge air cooled vehicle that is effective in controlling cooling system performance without inducing thermal fatigue in the charge air cooler or mechanical stress in the cooling system fan assembly.

The winter front assembly and method of the present invention have other objects and features of advantage which will become apparent from and are set forth in more detail in the accompanying drawing and following the best mode of carrying out the invention.

DISCLOSURE OF INVENTION

A winter front assembly for mounting to a vehicle having an axially aligned cooling assembly including a charge air cooler, a radiator and a radiator fan is provided. The winter front includes a sheet-like cover member having areas blocking the direct flow of air over at least a portion of the cooling assembly and defining an opening therethrough for the flow of air to the cooling assembly. The improvement in the winter front assembly of the present invention comprises, briefly, the cover member being formed to define an opening exposing at least a portion of each of the core tubes in the charge air cooler for direct flow of air thereover, and cover further being formed to define an opening which is substantially circumferentially balanced in an annular area in front of and proximate the tips of the fan blades. The winter front also includes an auxiliary cover carried by the sheet-like member and formed for securement in the opening to substantially reduce the opening area while maintaining direct flow over at least a portion of each of the core tubes and maintaining balanced air flow in the annular area. In a preferred form, the winter front opening is a vertically elongated substantially octagonal, oval which extends from the upper most to the lower most charge air cooler core tube, and the auxiliary cover member is an X-shaped member which reduces the area of core tubes exposed to a larger degree proximate the hub of the fan rather than in the annular area proximate the tips of the fan.

DESCRIPTION OF THE DRAWING

FIG. 1 is a front elevation view, partially broken away, of a typical cooling system assembly for a diesel truck or the like.

FIG. 2 is a front elevation view, slightly reduced, of the assembly of FIG. 1 with a winter front constructed in accordance with the present invention mounted thereto.

FIG. 3 is a front elevation view corresponding to FIG. 2 of the winter front assembly with an auxiliary area-reducing cover member mounted to the winter front.

THE BEST MODE FOR CARRYING OUT THE INVENTION

Referring now to FIG. 1, a typical diesel truck cooling system assembly, generally designated 21, is shown. Mounted in axially alignment for series flow of air therethrough are a charge air cooler, generally designated 22, a radiator, generally designated 23, and a fan assembly, generally designated 24. In most cooling systems, charge air cooler 22 will be mounted in advance of radiator 23, and the charge air cooler and radiator will be generally, but not precisely, aligned in front of the hub assembly 26 of the fan. In the configuration shown in FIG. 1, the charge air cooler is somewhat above and radiator 23 is somewhat below precise geometric concentricity with fan hub 26.

In order to permit the flow of air through charge air cooler, the charge air cooler includes an inlet conduit 27 which is coupled to triangularly shaped inlet manifold 28 for the flow of air to be cooled from the turbocharger (not shown) through charge air cooler core tubes 29. Mounted to outlet ends of core tubes 29 is a triangularly shaped outlet manifold 31, which is coupled to conduit 32 for the flow of cooled air to the inlet side of the engine. The construction and operation of the charge air cooler are not, per se, a novel portion of the present invention. In the embodiment shown, core tubes 29 will be seen to be horizontally oriented across the cooling assembly, although it will be understood that in some charge air coolers tubes 29 will be vertically oriented.

Radiator 23 typically will be formed as a plurality of vertically extending core tubes 33 coupled to an inlet manifold (not shown) and an outlet manifold 34 for the flow of cooling liquid, usually water and glycol, to the engine and a water pump (not shown).

Finally, cooling system 21 typically will include a fan assembly 24, mounted in a fan shroud 36, and having central fan hub 26 with radially extending fan blades 37. The number and configuration of the fan blades varies from cooling system to cooling system. The cooling system assembly 21 as shown in FIG. 1 is well-known in the prior art and does not comprise a novel portion of the present invention.

Referring now to FIGS. 2 and 3, the winter front assembly, generally designated 41, of the present invention can be described in detail. In the preferred form, winter front 41 is provided by a sheet-like cover member 42 having areas 43 blocking the direct flow of air over at least a portion of cooling assembly 21. Winter front cover member 42 defines opening means, generally designated 44, therethrough for the flow of air over cooling assembly 21 and, particularly, charge air cooler core tubes 29.

Mounting of winter front 41 over cooling assembly 21 can be accomplished by mounting means in the form of eyelets 46 in the edge of cover member 42 that receive twist-type fasteners (not shown) mounted on the front engine/radiator housing. It will be understood that snaps, hook and loop VELCRO brand fasteners and other fastening systems can be used to mount winter front 41 to the vehicle. The mounting means 46 and cooperating fasteners on the engine housing are positioned so as to position opening 44 in general axial alignment with fan hub 26.

As can be seen from FIG. 2, opening means 44 is a single opening which is substantially an octagonal oval that is vertically elongated and extends from a lowermost core tube 51 to an uppermost core tube 52 in the charge air cooler. Thus, all of the core tubes 29 and charge air cooler 22 are exposed for the direct flow of cooling air over the same, even though areas 43 of the winter front member 42 block portions of at least some of core tubes 29. Thus, when winter front 41 is mounted in front of cooling assembly 21, each of the core tubes 29 in the charge air cooler 22 is exposed to less cooling air so as to operate at a higher temperature, but each core tube 29 also is exposed to at least some cooling air to maintain a smaller temperature gradient between core tubes over the length of manifolds 28 and 31.

It also should be noted that winter front 41 blocks all of the incoming air from some of the vertically extending radiator core tubes 33. This blocking will cause some differential temperature to occur in the radiator core tubes, but the temperature drop in the radiator is much less significant and extreme than in the charge air cooler. Accordingly, complete blocking of some of radiator core tubes 33 can be tolerated.

Since opening means 44 is in general axial alignment with hub 26 of fan assembly 24, the shape of opening 44 is also formed so that it is substantially circumferentially balanced in an annular area in front of tips 53 (see FIG. 1) of fan blades 37.

In its largest opening configuration, as illustrated in FIG. 2, therefore, winter front assembly 41 of the present invention provides both a thermally balanced opening for minimization of thermal stress on the charge air cooler and a mechanically balanced opening for minimization of mechanical stress on fan assembly 24.

In order to permit operation in even colder conditions, winter front assembly of the present invention includes an auxiliary cover means, generally designated 61 and shown in FIG. 3, which substantially reduces the area of opening 44. Auxiliary cover member 61 is formed for selective securement to sheet-like cover member 42, for example, by snap fastener assemblies 62, mounted on the inside of cover member 42 proximate the edge defining opening 44.

In a very important feature of the present invention, auxiliary cover member 61 is formed with a shape which substantially reduces the area of opening means 44 while still maintaining direct air flow over at least a portion of each of charge air cooler tubes 29, and while maintaining circumferentially balanced air flow in the annular area proximate fan blade tips 53.

In the preferred form, auxiliary cover 61 is an X-shaped member having legs which extend to ends 63 (carrying snaps 62) so as to secure members 61 across opening 44. The result is that the auxiliary cover member 61 and main cover 42 together define four openings which are positioned in a balanced circumferential array around hub 26 so as to provide substantial balancing of loading on the fan and so as to expose at least a portion of all of the core tubes 29 in the charge air cooler.

The substantial reduction in area of opening 44 is accomplished primarily by disproportionately blocking the area of the core tubes 29 proximate fan hub 26. Thus, the percentage of opening 44 which has been reduced is greater in the area 64 proximate hub 26 than the percentage reduction in the annular area proximate tips 53 of the equaling system fan. This disproportionate area reduction is based upon the recognition that fan 24 tends to pull an annular stream most efficiently, with the volume of air proximate hub 64 being significantly less than the volume of air flown proximate tips 53. Thus, X-shaped member 61 blocks a central area of the core to a significant degree while the legs 66 block a much lower percentage of the total annular area in which air flow being pulled by the fan is greatest.

The winter front assembly in its reduced-area configuration of FIG. 2, therefore, maintains a low thermal stress by exposing a portion of all the core tubes while also maintaining low mechanical fan stress by keeping the annular area in which the greatest fan flow occurs relatively unobstructed.

The method of covering a cooling assembly with a winter front of the present invention will be apparent from the above set forth description of the apparatus. The method includes mounting a sheet-like cover member 42 having opening means 44 across the cooling assembly of the vehicle with the opening aligned with and exposing a portion of each of the core tubes of charge air cooler 22. The opening is formed and positioned during the mounting step so as to be substantially circumferentially balanced in an annular area in front of and proximate the tips of the fan assembly. Additionally, the method of the present invention includes mounting an auxiliary cover 61 to cover 42 to extend across opening 44 and substantially reduce the area of the opening without completely covering any of core tubes 29, and without circumferentially unbalancing the area of the opening means in the annular area proximate tips 53 of fan assembly 24.

In the preferred form, the winter front sheets 42 and 61 are formed of a vinyl material or a flexible fabric-like sheet. Winter front sheets 42 and 61 will be held by a grill work in front of the cooling assembly components so that they do not contact the high temperature elements. The winter front assembly must be capable of being easily removed for operation of the truck during summer months with full exposure of the cooling system components.

What is claimed is:

1. A cooling system for a vehicle comprising:
   a cooling assembly including a charge air cooler having a plurality of substantially horizontally extending core tubes, a radiator, and a radiator fan having a fan hub and fan blades extending radially from said fan hub;
   a sheet-like cover member having areas blocking the direct flow of air over at least a portion of said cooling assembly and defining a substantially oval-shaped opening means therethrough for the flow of air over said cooling assembly, said opening means being vertically elongated and extending vertically across all of said core tubes to expose at least a portion of each of said core tubes in said charge air cooler and being substantially circumferentially balanced in an annular area in front of and proximate the tips of said fan blades;
   mounting means carried by said sheet-like cover member for removably mounting said sheet-like cover member in front of said charge air cooler with said opening means in alignment with said charge air cooler; and
   auxiliary cover means formed for selective securement in a position over said opening means in said sheet-like cover member, said auxiliary cover means substantially reducing the area of said opening means while being formed to maintain direct air flow over at least a portion of each of said core tubes and to maintain circumferentially balanced air flow in said annular area.

2. The cooling system for a vehicle as defined in claim 1 wherein,
   said auxiliary cover means covers a greater percentage of the area of said opening means proximate said fan hub than the percentage of the area of said annular area.

3. The cooling system for a vehicle as defined in claim 1, wherein,
   said auxiliary cover means is releasably secured to said cover means and substantially reduces the area of said opening means proximate the area of said fan hub.

4. The cooling system for a vehicle as defined in claim 1 wherein,
   said auxiliary cover means covers substantially all the area of said opening means proximate said hub.

5. The cooling system for a vehicle as defined in claim 1 wherein,
   said auxiliary cover means is provided as an X-shaped member releasably mounted to said sheet-like cover member across said oval-shaped vertically elongated opening.

6. The cooling system for a vehicle as defined in claim 1 wherein,
   said X-shaped member is mounted by snap assemblies at each leg of said X-shaped member to said sheet-like cover member.

7. The cooling system for a vehicle as defined in claim 6 wherein,
   said X-shaped member defines with said sheet-like cover member four openings symmetrically arranged around said annular area.

8. The cooling system for a vehicle as defined in claim 1 wherein,
   said sheet-like cover member defines an opening means which is a single vertically elongated octagonal opening positioned to extend across all of said core tubes;
   said auxiliary cover means is provided as an X-shaped insert member releasably secured to said sheet-like cover member with legs of said X-shaped member extending on diagonal lines between opposed diagonal sides of said octagonal opening to define with said sheet-like cover member faces annularly arranged openings of substantially equal area.

9. A cooling system for a vehicle comprising:
   a cooling system including a charge air cooler having a plurality of core tubes, a radiator, and a radiator fan having a fan hub and fan blades extending radially from said fan hub;

a sheet-like cover member having areas blocking the direct flow of air over at least a portion of said cooling assembly and defining a substantially oval-shaped vertically elongated opening means therethrough for the flow of air over said cooling assembly, said opening means exposing at least a portion of each of said core tubes in said charge air cooler and being substantially circumferentially balanced in an oval-shaped vertically elongated area in front of and proximate the tips of said fan blades;

mounting means carried by said sheet-like cover member for removably mounting said sheet-like cover member in front of said charge air cooler with said opening means in alignment with said charge air cooler; and auxiliary cover means being substantially X-shaped and being releasably mounted to said sheet-like cover member across said opening means, said auxiliary cover means substantially reducing the area of said opening means while being formed to maintain direct air flow over at least a portion of each of said core tubes and to maintain circumferentially balanced air flow in said oval-shaped vertically elongated area.

10. A method of covering a cooling assembly of a vehicle with a winter front comprising the steps of:

providing a cooling assembly including an axially aligned charge air cooler having a plurality of core tubes, a radiator, and a radiator fan having a fan hub and fan blades;

mounting a sheet-like cover member having opening means therethrough across said cooling assembly with said opening means aligned with said charge air cooler and exposing at least a portion of each core tube of said charge air cooler, said opening means being substantially circumferentially balanced in an annular area in front of and proximate the tips of said fan blades; and positioning an auxiliary cover means in a position leaving at least a portion of said annular area in front of and proximate the tips of said fan blades open for air flow therethrough to said fan blades, said portion of said annular opening being substantially circumferentially balanced, and said positioning of said auxiliary cover means further resulting in a portion of each of said core tubes being exposed to direct air flow.

11. A cooling system for a vehicle comprising:

a cooling assembly including a charge air cooler having a plurality of core tubes, a radiator, and a radiator fan having a fan hub and fan blades extending radially from said fan hub;

a sheet-like cover member having areas blocking the direct flow of air over at least a portion of said cooling assembly and defining opening means therethrough for the flow of air over said cooling assembly, said opening means exposing at least a portion of each of said core tubes in said charge air cooler and being substantially circumferentially balanced in an annular area in front of and proximate the tips of said fan blades;

mounting means carried by said sheet-like cover member for removably mounting said sheet-like cover member in front of said charge air cooler with said opening means in alignment with said charge air cooler; and auxiliary cover means formed for selective securement in a position across said opening means to substantially reduce the total area of said opening means, said auxiliary cover means being incapable of completely covering said opening means in said annular area in front of and proximate the tips of said fan blades when secured across said opening means, and said auxiliary cover means being formed to maintain direct air flow over at least a portion of each of said core tubes and to maintain circumferentially balanced air flow in said annular area when secured across said opening means.

* * * * *